(12) United States Patent
Mamtimin et al.

(10) Patent No.: US 11,854,259 B2
(45) Date of Patent: Dec. 26, 2023

(54) HOLDUP MEASUREMENT USING QUANTIZED CLASSIFICATION AND CATEGORIZED LOCAL REGRESSION

(71) Applicant: HALLIBURTON ENERGY SERVICES, INC., Houston, TX (US)

(72) Inventors: Mayir Mamtimin, Spring, TX (US); Jeffrey James Crawford, Katy, TX (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 191 days.

(21) Appl. No.: 17/565,927

(22) Filed: Dec. 30, 2021

(65) Prior Publication Data

US 2022/0319166 A1 Oct. 6, 2022

Related U.S. Application Data

(60) Provisional application No. 63/168,669, filed on Mar. 31, 2021.

(51) Int. Cl.
| | |
|---|---|
| *G06V 10/82* | (2022.01) |
| *G01V 5/12* | (2006.01) |
| *E21B 47/003* | (2012.01) |
| *G06V 10/766* | (2022.01) |
| *G06V 20/10* | (2022.01) |

(52) U.S. Cl.
CPC ......... *G06V 20/194* (2022.01); *E21B 47/003* (2020.05); *G01V 5/12* (2013.01); *G06V 10/766* (2022.01); *G06V 10/82* (2022.01); *E21B 2200/22* (2020.05)

(58) Field of Classification Search
CPC ...... E21B 47/00; E21B 2200/22; E21B 33/00; E21B 47/003; G01V 5/04; G01V 5/12; G01T 1/00; G01T 1/36; G06V 20/194; G06V 10/58; G06V 10/82; G06V 10/454; G06V 10/764; G06V 10/766; G06N 20/00; G06N 3/0464; G06N 3/04; G06T 2207/20084; G06T 2207/20076
See application file for complete search history.

(56) References Cited

FOREIGN PATENT DOCUMENTS

| | | |
|---|---|---|
| CN | 111308543 A | 6/2020 |
| EP | 3637150 A1 | 4/2020 |
| WO | 2020239884 A1 | 12/2020 |

OTHER PUBLICATIONS

English abstract of CN111308543; retrieved from www.espacenet.com on Dec. 9, 2021.

*Primary Examiner* — Sumati Lefkowitz
*Assistant Examiner* — Michael Adam Shariff
(74) *Attorney, Agent, or Firm* — NOVAK DRUCE CARROLL LLP

(57) ABSTRACT

Aspects of the subject technology relate to determining a holdup measurement based on a gamma spectrum through machine learning. A spectral image based on a gamma spectrum generated downhole in a wellbore can be accessed. A component of a holdup measurement for the wellbore can be classified into a specific quantized level through application of a machine learning classification model to the spectral image. A continuous value for the component of the holdup measurement for the wellbore can be quantified by applying a machine learning quantization model associated with the quantized level.

20 Claims, 10 Drawing Sheets

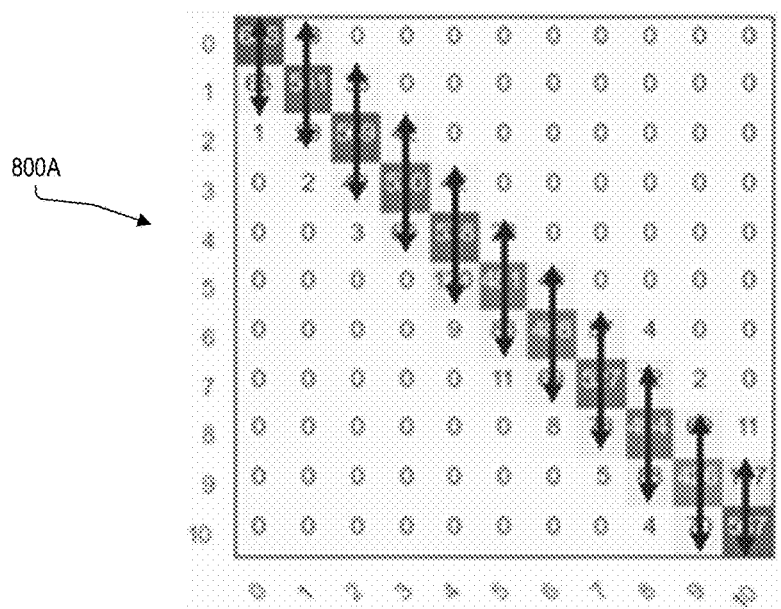
FIG. 8A
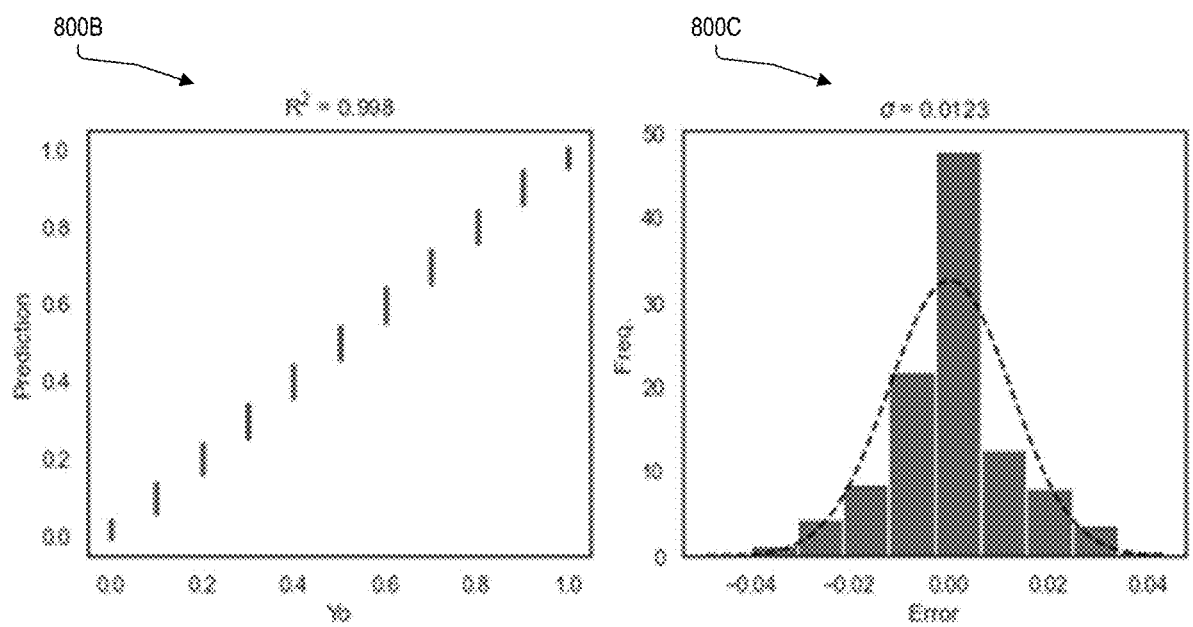
FIG. 8B
FIG. 8C

HOLDUP MEASUREMENT USING QUANTIZED CLASSIFICATION AND CATEGORIZED LOCAL REGRESSION

CROSS-REFERENCE TO RELATED APPLICATIONS

This application claims priority to U.S. provisional application No. 63/168,669 filed on Mar. 31, 2021, which is expressly incorporated by reference herein in its entirety.

TECHNICAL FIELD

Various aspects of the subject technology are related to measuring holdup through machine learning applied to gamma spectrum analysis and, in particular, to classifying a component of a holdup measurement and quantifying the component of the holdup measurement through machine learning applied in a gamma spectrum analysis.

BACKGROUND

In nuclear measurements, gamma detectors are often used to extract both characteristic energies and intensity of gamma emissions from nuclear interactions of interest. In operation, gamma detectors absorb the incident gamma energy and generate electric pulses from Compton scattering (i.e., scattering of a photon after an interaction with a charged particle), photoelectric, and pair-production mechanisms. In a gamma response, the electric pulse height, e.g. during a pulse mode of operation, corresponds to the gamma energy and the detection rate corresponds to the counting intensity or count rate. In principle, every energy channel and count rates contain useful information that describes specific nuclear interactions.

BRIEF DESCRIPTION OF THE DRAWINGS

Implementations of the present technology will now be described, by way of example only, with reference to the attached figures, wherein:

FIG. 8A illustrates an example of a confusion matrix of different quantized levels for quantitative and qualitative analysis of holdup measurements, in accordance with various aspects of the subject technology;

FIG. 8B illustrates a plot of predictions of holdup measurements applied through a weighted function during a quantification step, in accordance with various aspects of the subject technology;

FIG. 8C illustrates a plot of error as a function of frequency through a quantification step of applying a weighted function to predict holdup measurements within quantized levels, in accordance with various aspects of the subject technology.

DETAILED DESCRIPTION

Figure 1A:
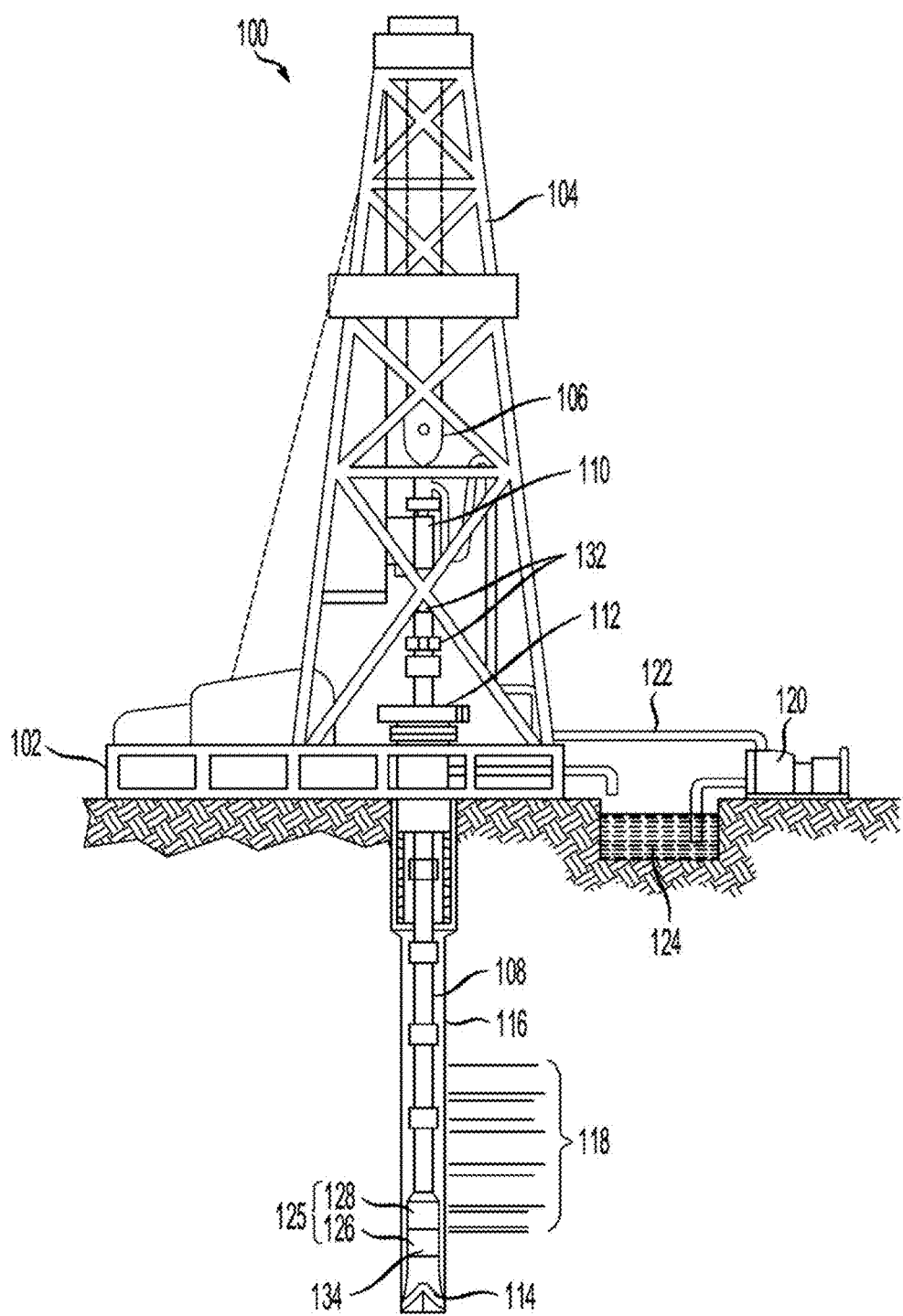
FIG. 1A is a diagram of an example downhole environment, in accordance with various aspects of the subject technology.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

In petrophysical applications, holdup refers to the volumetric ratios of oil, water, and gas in a borehole. There are several challenges in the industry regarding accurate holdup measurement. In particular, when a pulsed neutron logging tool is used to measure holdup, problems exist with correcting the tool response in subtracting the effect of borehole holdup. Accurate knowledge of borehole holdup content directly determines the accuracy of oil saturation in the formation. Additionally, in horizontal production wells, it is important to accurately measure the holdup to determine the flow. Traditional holdup measurement tools are unreliable in horizontal wells because of fluid/gas segregation due to gravity. Existing pulsed neutron log ("PNL")-based holdup techniques lack the accuracy, generality, and applicability to a wide range of borehole variations and reservoir conditions. Further, existing PNL-based methods use conventional routes to analyze gamma spectrum with limited accuracy and applicability.

The disclosed technology addresses the foregoing limitations of a conventional holdup measurement technique by measuring holdup through machine learning applied during gamma spectrum analysis. More specifically, the disclosed technology relates to classifying a component of a holdup measurement and quantifying the component of the holdup measurement through machine learning applied during gamma spectrum analysis.

Some aspects of the disclosed technology can be utilized in downhole tools for logging while drilling (LWD) applications. However, as will be discussed in further detail, other types of environments including measurement while drilling (MWD) or wireline wellbore environments are similarly applicable.

Referring to FIG. 1A, a diagrammatic view illustrates an exemplary wellbore drilling environment 100, for example, a logging while drilling (LWD) and/or measurement while drilling (MWD) wellbore environment, in which the present disclosure can be implemented. As illustrated in FIG. 1A, a drilling platform 102 is equipped with a derrick 104 that supports a hoist 106 for raising and lowering one or more drilling components 132 which can include, for example, a drill string 108 which can include one or more drill collars 134, a drill bit 114, and/or a bottom-hole assembly 125. The drilling components 132 are operable to drill a wellbore 116. The drilling components 132 also can include housings for one or more downhole tools. The drilling components 132 can be manufactured from one or more materials including, but not limited to, steel, stainless steel, an alloy, or the like. The material can also be magnetic or non-magnetic.

The hoist 106 suspends a top drive 110 suitable for rotating the drill string 108 and lowering the drill string 108 through a well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to the top drive 110, down through the interior of the drill string 108, through orifices in the drill bit 114, back to the surface via the annulus around the drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As illustrated in FIG. 1A, sensors 126 can be provided, for example integrated into the bottom-hole assembly 125 near the drill bit 114. The sensors 126, in another example, can be integrated into a drill collar of a pressure sleeve system. As the drill bit 114 extends the wellbore 116 through the formations 118, the sensors 126 can collect measurements of various drilling parameters, for example relating to various formation properties, the orientation of the drilling component(s) 132, dog leg severity, pressure, temperature, weight on bit, torque on bit, and/or rotations per minute. The sensors 126 can be any suitable sensor to measure the drilling parameters, for example transducers, fiber optic sensors, and/or surface and/or downhole sensors. The bottom-hole assembly 125 can also include a telemetry sub 128 to transfer measurement data to a surface receiver 130 and to receive commands from the surface. In some examples, the telemetry sub 128 communicates with a surface receiver 130 using mud pulse telemetry. In other examples, the telemetry sub 128 does not communicate with the surface, but rather stores logging data for later retrieval at the surface when the logging assembly is recovered. Notably, one or more of the bottom-hole assembly 125, the sensors 126, and the telemetry sub 128 can also operate using a non-conductive cable (e.g. slickline, etc.) with a local power supply, such as batteries and the like. When employing non-conductive cable, communication can be supported using, for example, wireless protocols (e.g. EM, acoustic, etc.) and/or measurements and logging data can be stored in local memory for subsequent retrieval at the surface.

Each of the sensors 126 can include a plurality of tool components, spaced apart from each other, and communicatively coupled together with one or more wires. The telemetry sub 128 can include wireless telemetry or logging capabilities, or both, such as to transmit information in real time indicative of actual downhole drilling parameters to operators on the surface.

The sensors 126, for example an gamma ray logging tool, can also include one or more computing devices 150 communicatively coupled with one or more of the plurality of drilling components 132. The computing device 150 can be configured to control or monitor the performance of the sensors 126, process logging data, and/or carry out the methods of the present disclosure.

In some examples, one or more of the sensors 126 can communicate with the surface receiver, such as a wired drillpipe. In other cases, the one or more of the sensors 126 can communicate with the surface receiver by wireless signal transmission. In at least some cases, one or more of the sensors 126 can receive electrical power from a wire that extends to the surface, including wires extending through a wired drillpipe. In at least some examples the methods and techniques of the present disclosure can be performed by a controller, for example a computing device, on the surface. In some examples, the controller can be included in and/or communicatively coupled with a surface receiver. For example, the surface receiver of wellbore operating environment 100 at the surface can include one or more of wireless telemetry, processor circuitry, or memory facilities, such as to support substantially real-time processing of data received from one or more of the sensors 126. In some examples, data can be processed at some time subsequent to its collection, wherein the data can be stored on the surface at surface receiver, stored downhole in telemetry sub 128, or both, until it is retrieved for processing.

Figure 1B:
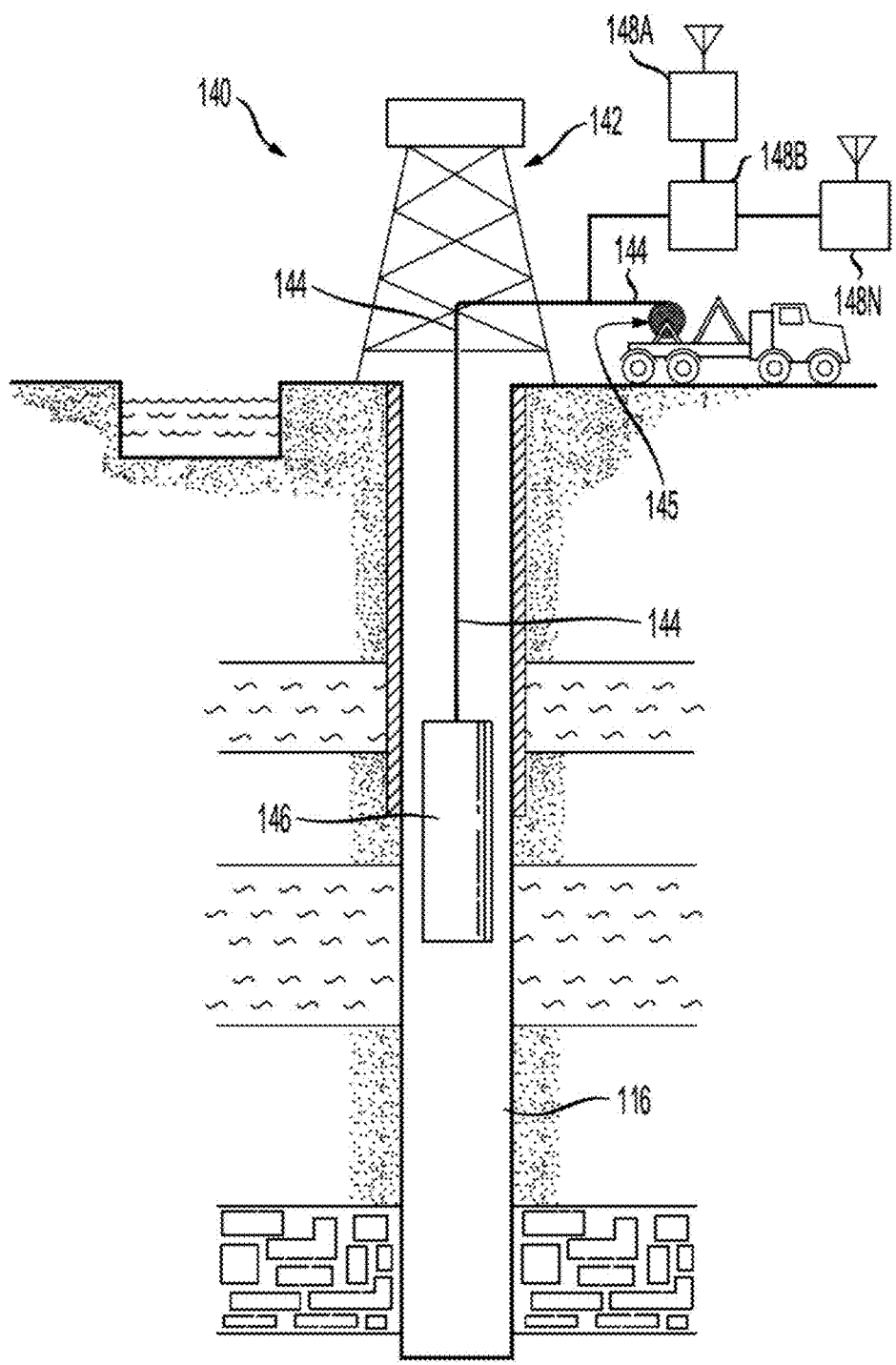
FIG. 1B is a diagram of another example downhole environment, in accordance with various aspects of the subject technology.

Referring to FIG. 1B, an example system 140 for downhole line detection in a downhole environment can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a gamma ray logging tool. The tool body 146 can be lowered into the wellbore 116 by wireline conveyance 144. The wireline conveyance 144 can be anchored in a drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
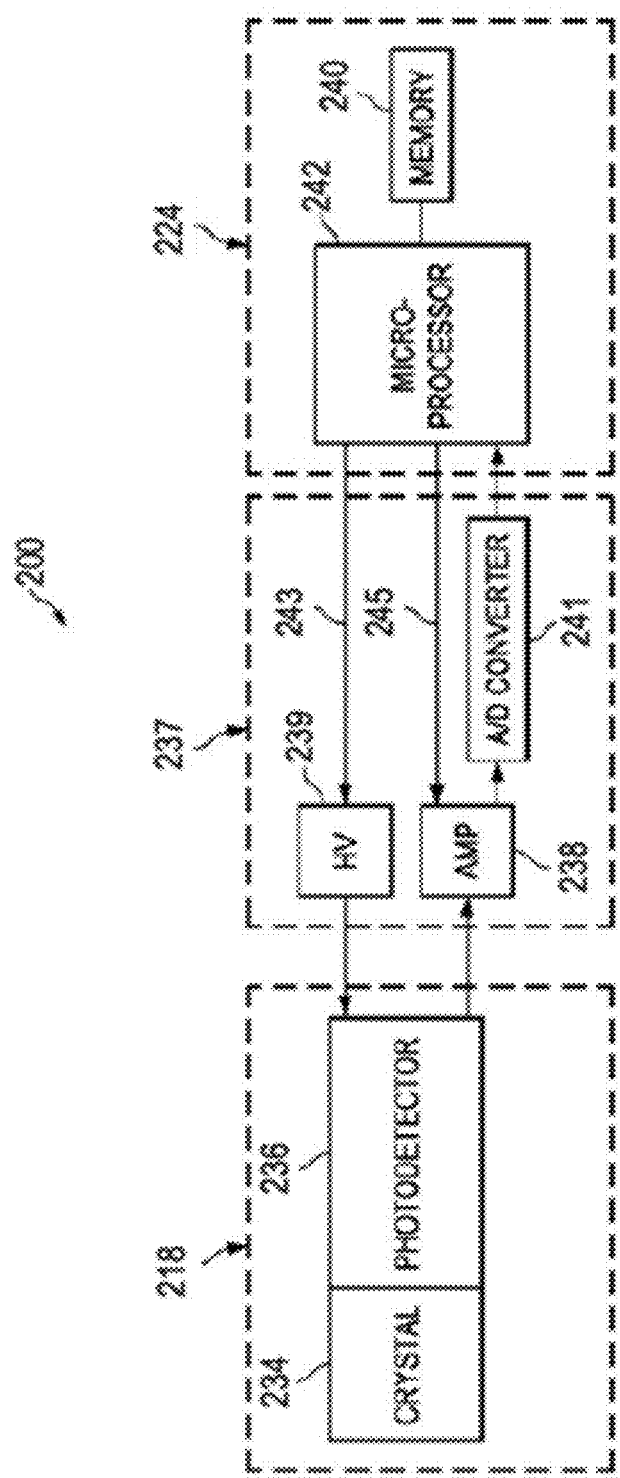
FIG. 2 is a diagram illustrating an example gamma-ray detector system, in accordance with various aspects of the subject technology.

FIG. 2 is a diagram illustrating an example gamma ray detector system 200, in accordance with various aspects of the subject technology. The gamma ray detector system 200 includes a downhole gamma ray detector 218, electronics unit 237, and a processing unit 224. The gamma ray detector 218 may be part of a drilling assembly of a downhole tool for logging while drilling or measuring while drilling operations (see FIG. 1A), or may be a wireline tool for logging an existing well (see FIG. 1B). The gamma ray detector system 200 may include one or more gamma ray detectors 218, e.g., 2, 3, 4, 5, 6, or more. Each gamma ray detector 218 counts gamma ray energy emitted naturally subsurface, but could also be used for other sources of gamma rays in the wellbore. The gamma ray detectors may be near an exterior of the logging tool and be spaced about a circumference. While multiple gamma ray detectors may be included, only one is explicitly presented here.

The one or more gamma ray detectors 218 provide signals that scale the energy deposited by the gamma rays. The gamma ray detector 218 includes one or more scintillator crystals 234 for receiving the gamma rays that then create light emissions that influence an adjacent, optically-coupled photodetector 236, e.g., a photomultiplier tube (PMT). The gamma ray detector 218 is electrically coupled to an electronics unit 237. The electronics unit 237 may include an amplifier 238, a variable high voltage supply unit (i.e., power supply) 239, and an analog-to-digital (A/D) converter 241. The high voltage supply unit 239 is coupled to and powers one or more of the gamma ray detectors 218. One high voltage supply unit (i.e., power supply) 239 may be used to power multiple gamma ray detectors. The high voltage supply unit or units 239 may be configured so that their output voltage can be adjusted by a controller or processor (e.g., microprocessor) 242 as suggested by 243.

The electronics unit 237 may also include the one or more amplifiers 238 to modify the amplitude of the signals coming from the one or more gamma ray detectors 218. The amplifier 238 may be configured to be adjusted by a controller as suggested by 245. Finally, the electronics unit 237 includes the analog-to-digital (A/D) converter 241 to convert voltage signals to digital signals that may be passed to the processing unit 224. The electronics unit 237 is for converting and processing (e.g., adjusting the signal amplitude or adjusting the voltage supplied to the gamma ray detector) the signals including preparing digital signals.

The processing unit 224 includes one or more memories 240 associated with one or more processors, e.g., microprocessor 242. As is well understood, the one or more memories 240 together with the one or more processors 242 are operable to execute code or otherwise accomplish various functions as desired. The processor 242 may be configured to control the output voltage of the one or more variable high-voltage supplies 239 or the one or more amplifiers 238.

In some embodiments, the processing unit 224 may implement a gamma spectral analysis system (not shown in FIG. 2) for the one or more gamma ray detectors 218. The gamma spectral analysis system implemented by the processing unit 224 can gather spectrum data associated with a gamma spectrum. Additionally, the gamma spectral analysis system can construct a spectral image from the gamma spectrum data. Further, the gamma spectral analysis system can categorize classify a component of a holdup measurement for a wellbore into a specific quantized level through application of a machine learning classification model to a spectral image. Additionally, the gamma spectral analysis system can quantify a continuous value for the component of the holdup measurement based on the quantized level of the component of the quantized level.

More specifically, the gamma spectral analysis system can function with a PNL tool to measure holdup in a wellbore. With respect to gamma spectral analysis and a PNL tool, neutron diffusion in a downhole environment can be described by the Boltzmann Transport Equation (BTE). In its simplest terms, BTE is a conservation equation of neutron transportation in space and time. Neutrons added to the system are the source term and the neutron loss is the combination of neutron absorption and neutrons streaming out of the system (e.g. neutron current J). Full or partial neutron energy can be absorbed to elevate nuclear energy level.

Figure 3:
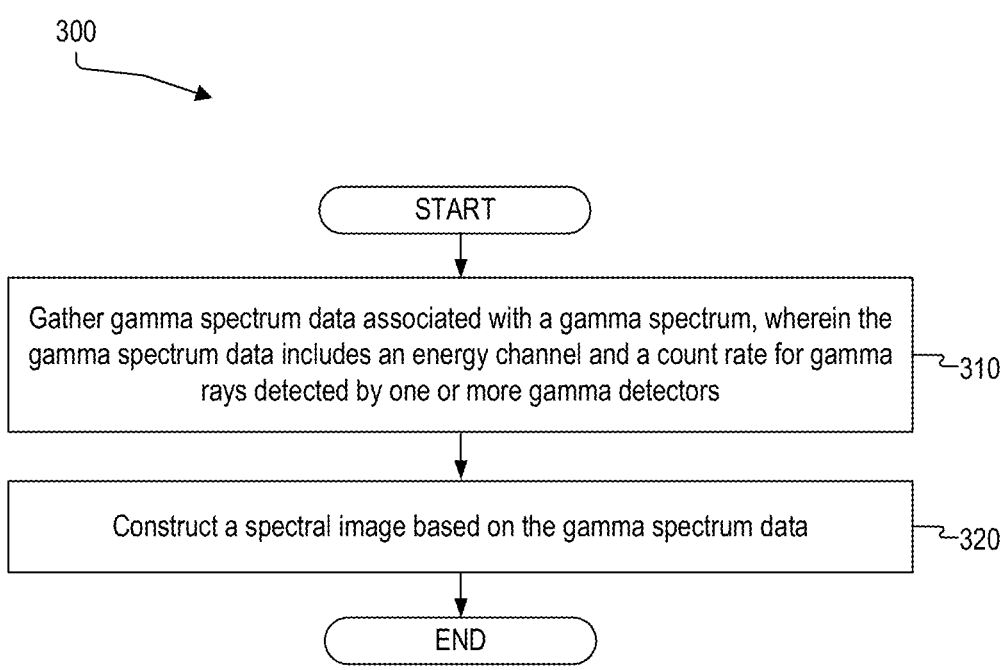
FIG. 3 illustrates a flowchart for an example method of generating a spectral image based on gamma spectrum data as part of performing gamma spectral analysis, in accordance with various aspects of the subject technology.

FIG. 3 illustrates a flowchart for an example method of generating a spectral image based on gamma spectrum data as part of performing gamma spectral analysis, in accordance with various aspects of the subject technology. The method 300 shown in FIG. 3 is provided by way of example, as there are a variety of ways to carry out the method. Additionally, while the example method 300 is illustrated with a particular order of steps, those of ordinary skill in the art will appreciate that FIG. 3 and the modules shown therein can be executed in any order and can include fewer or more modules than illustrated. Each module shown in FIG. 3 represents one or more steps, processes, methods or routines in the method.

At step 310, the method 300 includes gathering gamma spectrum data associated with a gamma spectrum. Gamma spectrum data can include applicable data related to gathering a gamma spectrum. For example, a gamma spectrum analysis system can gather gamma spectrum data generated by one or more gamma detectors (e.g., one or more gamma detectors 218 as illustrated in FIG. 2). Such gamma spectrum data can be gathered downhole through a downhole tool by one or more gamma detectors. As previously mentioned, the gamma ray detector may be part of a drilling assembly of a downhole tool for logging while drilling, or measuring while drilling operations (see FIG. 1A), or may be a wireline tool for logging an existing well (see FIG. 1B).

Gamma spectrum data can be generated based on the principles of Gamma energy emission. Specifically, Gammas can be emitted when nucleus deexcites from an elevated energy level to a lower state. Nuclear excitation can be induced by various methods. Regardless of excitation mechanisms, a nucleus deexcites with characteristic gammas (unique gamma energies) due to its quantized energy levels. During this process, a single gamma or a combination of multiple gammas are emitted with corresponding branching ratios (or emission probabilities). When a detector receives these gammas, a cascade of electric pulses is generated. Depending on the stochastic gamma interaction modes, some pulses correspond to the full energy and others to the partial energy. Gamma spectrum analysis aims to extract qualitative (which nucleus the emission is from) and quantitative (quantity of the target nucleus in the sample) information from the entire spectrum.

Neutron inelastic scatter only occurs when neutron energy is high enough to excite the target nucleus. Thus, this process is only available for fast neutrons. The excited target nucleus relaxes to its ground state by emitting characteristic gamma radiation. This relaxation process is prompt and has no time delay (10-24 s). Thus, inelastic scatter can be measured by the energy and intensity of the emitted gamma or the timing and spatial characteristics of the emitted gammas.

In some examples, the gamma spectrum data can include energy channels and a count rate for the gamma rays detected by the gamma detector(s). The count rate represents the number of decays (i.e., counts) recorded each second by the gamma detector(s). For example, the gamma spectrum data can be plotted as a graph as a function of the number of counts (e.g., on a vertical axis or y-axis) vs. energy channel (e.g., on a horizontal axis or x-axis).

Further, gamma spectrum data can include environmental information associated with generating a gamma spectrum. In turn, gamma spectrum data including environment information can be used in implementing the technology described herein.

Returning back to the flowchart shown in FIG. 3, at step 320, the method 300 includes constructing a spectral image based on the gamma spectrum data. For example, the gamma spectrum analysis system can construct the spectral image, which may be a digital feature map such as a pixelated image, based on the gamma spectrum data gathered at step 310.

According to some examples, the spectral image is a pixelated image where a location of each pixel corresponds to the energy channel of the gamma spectrum and a brightness of each pixel corresponds to the count rate of the gamma spectrum. By reconstructing the gamma spectrum (e.g., energy channel converted into the location of a pixel and the number of counts converted into the brightness of the corresponding pixel), the gamma spectrum can be converted to a digital feature map that can be analyzed using image processing algorithms.

In order to construct the spectral image based on the gamma spectrum data, one or a combination of normalization, background subtraction, reshaping, and pixelated image construction can be performed. Specifically, and potentially based on a type of gamma spectrum analysis that is performed, the gamma spectrum data can be normalized, background subtracted, and reshaped to include derived features in the spectral image. Background subtraction can include, by way of example, one or a combination of binning by energy and detector resolution, normalization by detector efficiency, normalization by Compton continuum, reshaping by mathematical models, and deriving new features based on physics and application.

Figure 4:
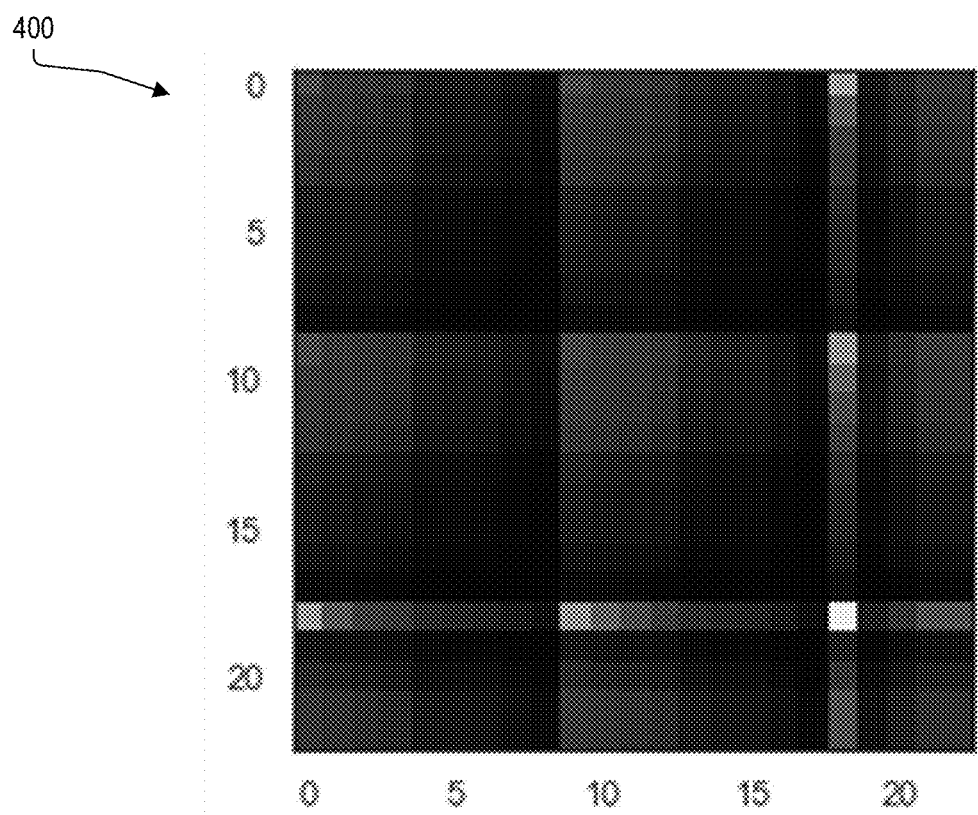
FIG. 4 shows an example of a spectral image, in accordance with various aspects of the subject technology.

FIG. 4 is an example spectral image 400 generated based on a gamma spectrum, in accordance with various aspects of the subject technology. In some examples, to generate the spectral image 400 shown in FIG. 4, a spectral vector with 256 energy channels can be first background subtracted and normalized based on the gamma spectrum data associated with the gamma spectrum. The vector can then be converted to the spectral image. The vector can be further reduced in dimension by energy bins to generate a new vector. The new vector can be expanded with derived features based on the application of analysis.

As shown in FIG. 4, the vector can be pixelated to construct the pixelated image 400, for example, in which a location of each pixel corresponds to the energy channel and a brightness of each pixel corresponds to the count rate. While the spectral image 400 (i.e., pixelated image 400) is 25 pixels by 25 pixels, a spectral image can be formed by any applicable number of elements, e.g., addressable elements.

In a conventional gamma spectrum, various peaks overlap each other, for example, due to mixtures of many elements and many different chemical compositions, and therefore, a difficulty arises as to matching elemental or nuclear properties of the specific element or isotope. The spectral image 400, on the other hand, can provide a more accurate and less time-consuming spectral analysis based on the digital map per se.

Furthermore, while the example spectral image 400 (i.e., pixelated image 400) shown in FIG. 4 is formed based on a spectral vector with 256 channels, a spectral vector with applicable characteristics, e.g. an applicable number of channels, can be applied in forming a spectral image.

According to some examples, the method 300 can further include training one or more machine learning models based on the spectral image. For example, the gamma spectrum analysis system can train one or more machine learning models based on the spectral image, which is constructed at step 320.

According to some examples, the one or more machine learning models can be a convolutional neural network (CNN), which is a subcategory of multi-layer perceptron, specifically developed for image analysis. In training the convolutional neural network, a spectral image with dimension or resolution by addressable element can be served as input. Additionally, brightness ranges, e.g., from 0-255, of each addressable element within the spectral image can serve as input. In various embodiments, brightness levels for a red channel, a green channel, and a blue channel (i.e., RGB channels) at each addressable element can serve as input.

Convolution can be a dot product of a kernel, or a filter, and a patch of an image. A patch of an image can be a local receptive field of the same size as the image. A kernel can define what type of pattern or signal to extract from each receptive field in identifying features of a gamma spectrum.

In some examples, the training of the machine learning model (e.g., convolutional neural network) can include applying a convolutional layer to the spectral image. A convolutional layer can be constructed and applied to all or a portion of the spectral image. Specifically, a convolutional layer can be applied to extract local features of a gamma spectrum from the spectral image, for example, based on neighboring energy channels, neighboring gamma peaks, or neighboring pixels.

Furthermore, the training of the machine learning model (e.g., convolutional neural network) can include applying a pooling layer to the spectral image. A pooling layer can also be constructed and applied to all or a portion of the spectral image. Specifically, a pooling layer can be applied to extract global features of a gamma spectrum from the spectral image, for example, based on the entire spectral image (i.e., the spectral image as a whole).

In some examples, the pooling layer can be applied to the spectral image after the convolutional layer is applied to the spectral image. Specifically, convolutional layer(s) can be applied to extract patterns and details from neighboring pixels or channels in the spectral image. Subsequently, pooling layer(s) can be applied to extract more dynamic features from the entire spectral image. By repeating application of convolutional layer(s) and pooling layer(s), a fully connected neural network for final quantitative, regression, or qualitative, classification, analysis can be generated.

According to some examples, the method 300 can further include extracting one or more features of the gamma spectrum from the spectral image through the one or more machine learning models. Any applicable machine learning techniques/models can be applied in extracting the one or more features of the gamma spectrum from the spectral image. Specifically, one or more models can be applied in extracting the one or more features from the spectral image. More specifically, one or more convolutional neural networks can be applied in extracting the one or more features from the spectral image. Extracted features of the gamma spectrum can include applicable features of a gamma spectrum that can be extracted for performing spectral analysis. In some examples, the extracted features can include an elemental concentration of a sample area.

In some examples, machine learning models applied in extracting the one or more features can be trained using one or a combination of simulated gamma spectrum data, test gamma spectrum data, and historical gamma spectrum data. For example, the model can be trained based on gamma spectrum data that is gathered by a gamma spectrum response on a test machine.

According to some examples, the extracting of the one or more features of the gamma spectrum from the spectral image can include extracting local features of the gamma spectrum from the spectral image, extracting global features of the gamma spectrum from the spectral image, and identifying the one or more features of the gamma spectrum based on the local features and/or the global features of the gamma spectrum. For example, not only individual gamma peaks are identified, but also overall spectral shape can be extracted for full scale analysis.

Local features include applicable features that occur in portions of a corresponding gamma spectrum of a spectral image such as gamma peaks in a gamma spectrum. For example, a convolutional layer can be applied to a spectral image to extract local features of the gamma spectrum based on neighboring features (e.g., neighboring energy channels, neighboring gamma peaks, or neighboring pixels).

Global features include applicable features that occur across a corresponding gamma spectrum of a spectral image. For example, a pooling layer can be applied to a spectral image to extract global/dynamic features, such as a relative correlation between different gamma peaks and a slope of the gamma spectrum based on the entire spectral image (i.e., the spectral image as a whole).

Furthermore, the method 300 can perform a gamma spectrum analysis based on the one or more features extracted as described above. Characteristics of extracted features can vary across applications and depend ultimately on a specific type of spectral analysis that is ultimately performed based on the extracted features. For example, features can be extracted at a resolution that facilitates the performance of a specific type of spectral analysis.

Examples of gamma spectrum analyses that can be performed using the subject technology include elemental and isotopic analysis, an environmental radiation monitoring analysis, a nuclear nonproliferation analysis, a nuclear well logging analysis, a capture spectral analysis, an inelastic spectral analysis, a ratio-based saturation analysis, a ratio-based holdup analysis, a yield-based saturation analysis, a yield-based holdup analysis, a natural gamma spectral analysis, a gamma-gamma density measurement analysis, and a neutron-gamma density measurement analysis.

Figure 5:
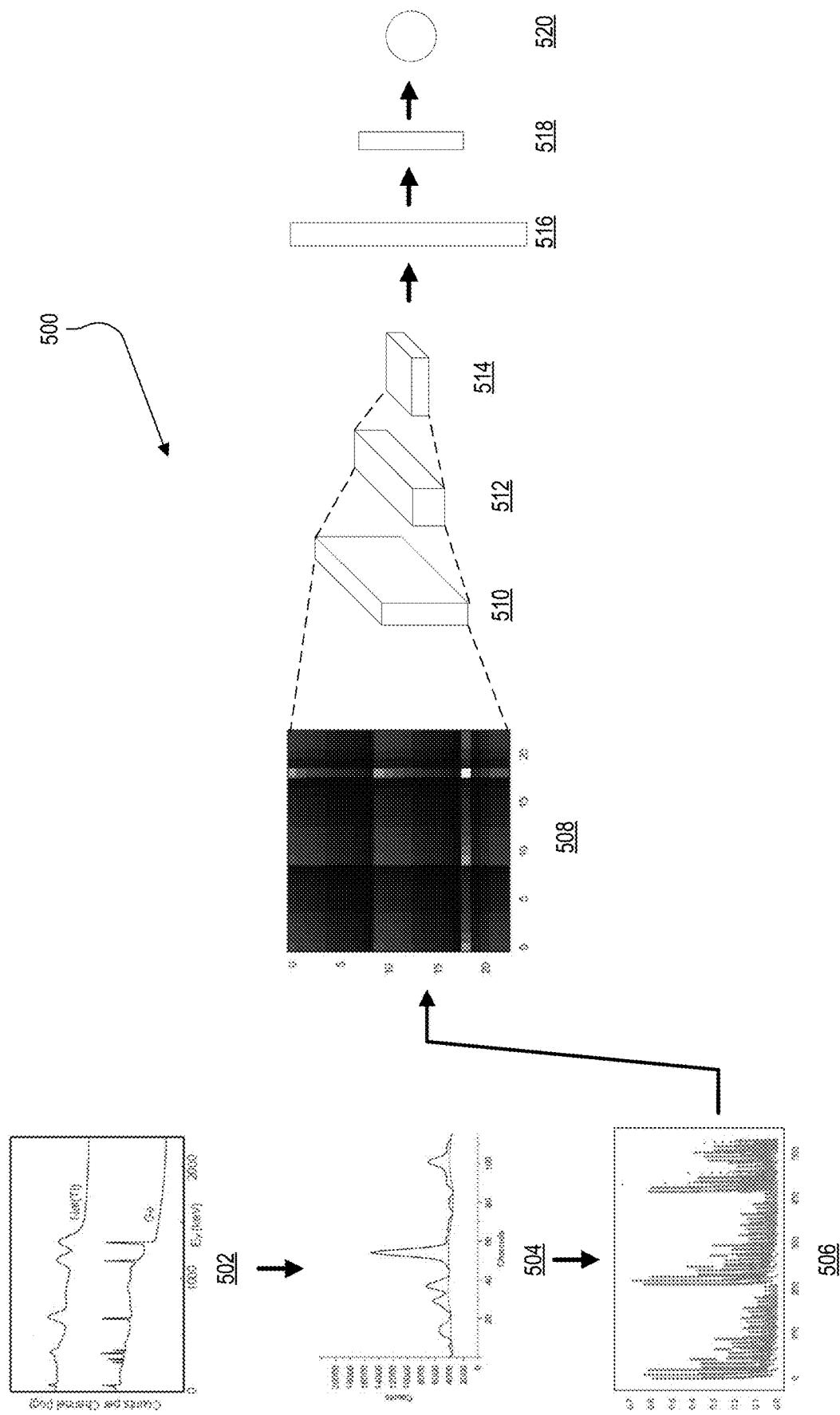
FIG. 5 is a flow of an example technique for identifying features of a gamma spectrum through a spectral image, in accordance with various aspects of the subject technology.

FIG. 5 is a flow 500 of an example technique for identifying features of a gamma spectrum through a spectral image, in accordance with various aspects of the subject technology. At step 502, raw gamma spectrum can be provided. For example, a gamma spectrum analysis system can receive the raw gamma spectrum or gather gamma spectrum data associated with the raw gamma spectrum. The raw gamma spectrum can provide gamma spectrum data such as counts per channel (e.g., count rates) and corresponding energy channels.

At step 504, the raw gamma spectrum can be normalized and background subtracted. The background subtraction can separate foreground elements out from the background so that the background (e.g., noise) can be eliminated from the image.

At step 506, an expanded feature vector can be reshaped. More specifically, an expanded feature vector corresponding to environmental features associated with the gathering of the gamma spectrum data can be reshaped. Environmental features, as used herein, include applicable features associated with a generated gamma spectrum. Specifically, environmental features include applicable features present in the environment during the process of acquiring gamma spectrum data through one or more gamma detectors to generate a gamma spectrum. For example, environmental features can include a size of a borehole in which gamma spectrum data is gathered to generate a gamma spectrum. Examples of environmental features can further include a casing size of a casing lining the borehole, a tool standoff, porosity of a surrounding formation, oil saturation of the surrounding formation, and lithology of the surrounding formation.

At step 508, a spectral image (e.g., pixelated image 400 illustrated in FIG. 4) can be constructed. For example, the spectral image can be a pixelated image where a location of each pixel corresponds to the energy channel and a brightness (i.e., intensity) of each pixel corresponds to the count rate. The pixelated image can be based on a spectral vector with 256 channels or a spectral vector with applicable characteristics, e.g. an applicable number of channels.

At steps 510, 512, and 514, the spectral image can be applied as input for one or more machine learning models. For example, the spectral image (e.g., pixelated image 400 illustrated in FIG. 4) can be used as input for a convolutional neural network where convolutional layer(s) and pooling layer(s) are repeatedly applied to extract local and global features, respectively, from the spectral image.

At steps 516 and 518, such layers (e.g., convolutional layer(s) and pooling layer(s) of the convolutional neural network) can be fully connected. At step 520, fully connected layers from steps 516 and 518 can be treated with regularization (e.g., dropout) to yield a final output of interest. Such fully connected neural network can be used for a qualitative (e.g., classification) and quantitative (e.g., regression) analysis as described in further detail below with respect to FIG. 6.

Figure 6:
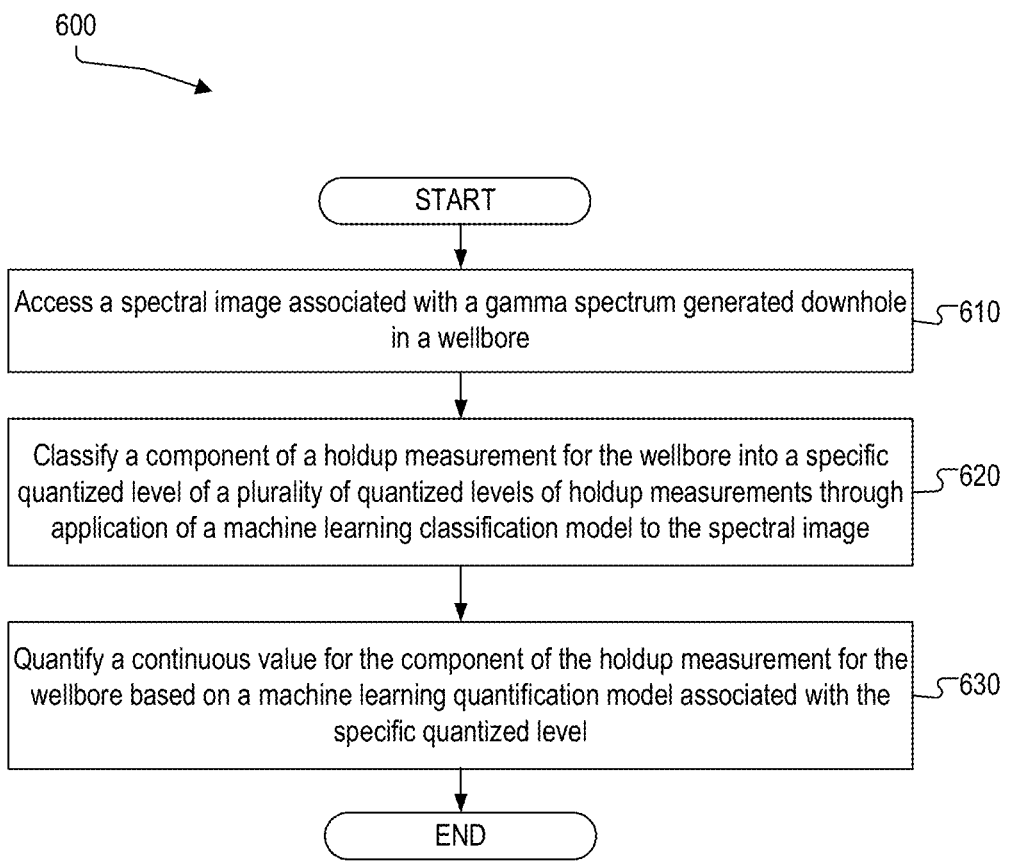
FIG. 6 illustrates a flowchart for an example method of determining a holdup measurement based on a gamma spectrum through machine learning as part of performing gamma spectral analysis, in accordance with various aspects of the subject technology.

FIG. 6 illustrates a flowchart for an example method 600 of determining a holdup measurement based on a gamma spectrum through machine learning as part of performing gamma spectral analysis. The method 600 shown in FIG. 6 is provided by way of example, as there are a variety of ways to carry out the method. Additionally, while the example method 600 is illustrated with a particular order of steps, those of ordinary skill in the art will appreciate that FIG. 6 and the modules shown therein can be executed in any order and can include fewer or more modules than illustrated. Each module shown in FIG. 6 represents one or more steps, processes, methods or routines in the method.

At step 610, a spectral image associated with a gamma spectrum generated downhole in a wellbore can be accessed. Specifically, a spectral image generated from both environmental data and raw gamma spectrum data can be accessed. For example, a gamma spectral analysis system can access a spectral image (e.g., spectral image 400 as illustrated in FIG. 4) associated with a gamma spectrum, which may be generated downhole in a wellbore.

In some examples, the spectral image can be a pixelated image (e.g., pixelated image 400 as illustrated in FIG. 4) where a location of a pixel corresponds to an energy channel of the gamma spectrum and a brightness of the pixel corresponds to a count rate of the gamma spectrum.

As described in detail below, the spectral image can be used to learn, via one or more machine learning models, different features and/or characteristics that can be correlated to holdup measurements (e.g., the volumetric ratio of components in the borehole).

At step 620, a component of a holdup measurement for the wellbore can be classified into a specific quantized level of a plurality of quantized levels of holdup measurements through application of a machine learning classification model to the spectral image. For example, a gamma spectral analysis system can classify a component of a holdup measurement for the wellbore into a specific quantized level of a plurality of quantized levels of holdup measurements through application of a machine learning classification model (e.g., convolutional neural network) to the spectral image (e.g., spectral image 400 illustrated in FIG. 4) to determine a range of the holdup measurement.

A holdup refers to the volumetric ratios of oil, water, and gas in the borehole. In some examples, a holdup measurement is to determine a volumetric percentage of the components such as oil, water, and gas in the borehole. In some instances, the component of the holdup measurement can include at least one of a volume of oil in the wellbore, a volume of gas in the wellbore, and a volume of water in the wellbore. For example, the holdup measurement of the present disclosure can be a two-phase holdup measurement (e.g., oil and water) or a three-phase holdup measurement (e.g., oil, water, and gas).

In some instances, determining a borehole holdup measurement may require a detailed correlation map since the nuclear spectral measurement can be affected by varying environmental features such as a borehole, casing, and formation. Theoretically, each energy channel contains useful data to reconstruct the borehole environment from the measured spectrum. While elements like C, O, Ca, and Si can indicate general elemental composition, an overall spectral shape can indicate bulk matrix and density. As such, based on the spectral map, which is a digital feature map per se converted based on a gamma spectrum, not only local features (e.g., individual gamma peaks) but also global features (e.g., overall spectral shape and slope) can be extracted and correlated to the holdup measurement, which can provide a full spectral analysis with improved accuracy. Example features that can be extracted from the spectral image can include but are not limited to, characteristic gamma peaks, ratios or algebraic expressions of ratios, entire spectrum or spectral vector, decay spectrum or decay constant, differential attenuation or electron density index, or any combination of the above.

Figure 7A:
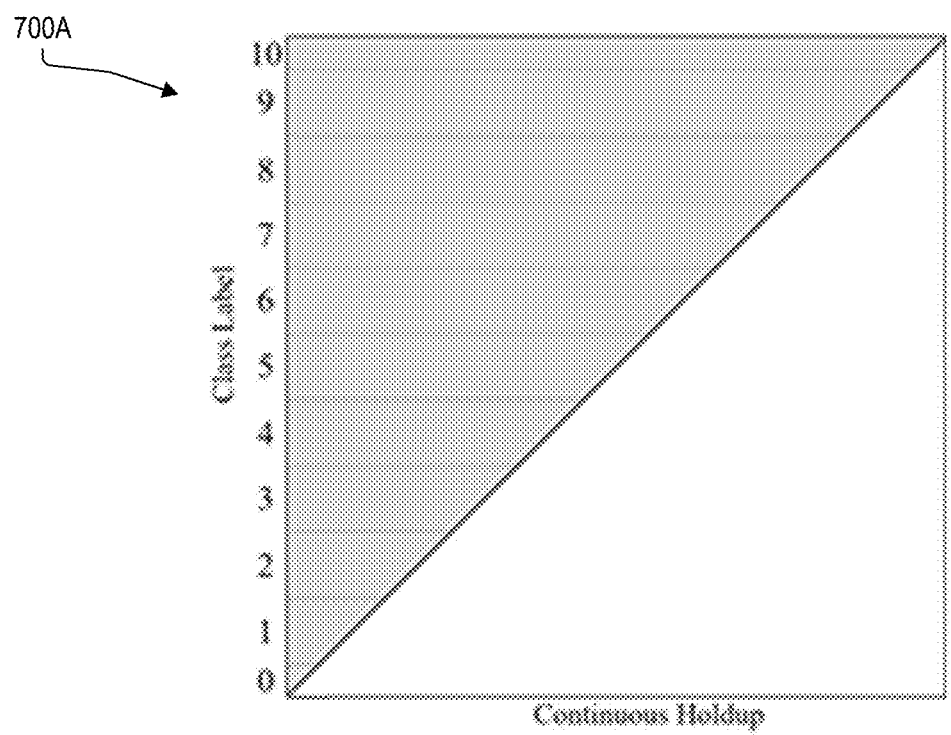
FIG. 7A illustrates an example of continuous holdup measurements with respect to quantized ranges corresponding to quantized levels, in accordance with various aspects of the subject technology.

In some examples, a holdup is a continuous quantity. However, it can be classified into quantized levels based on a desired absolute accuracy. Referring to FIG. 7A, a graph 700A illustrates an example of continuous holdup measurements with respect to quantized ranges corresponding to quantized levels, in accordance with various aspects of the subject technology. As shown in FIG. 7A, the classification labels are classified into 11 categories (e.g., from 0 to 10). For example, 0-100% oil holdup can be classified into 11 categories ranging from 0 to 10.

In some examples, quantized levels (i.e., classification labels) include ranges in which a holdup measurement can be classified. For example, a quantized level can include greater than or equal to 50% of a volume of a substance and less than 50% of a volume of the substance. In some instances, quantized levels can correspond on a per-component basis of a holdup measurement. For example, quantized levels can correspond to different ranges of oil volume, different ranges of gas volume, and different ranges of water volume.

According to some examples, a component of a holdup measurement (e.g., volumetric ratio of oil, water, or gas) can be classified at step 620 through a machine learning model applied to a corresponding spectral image. In some examples, any applicable machine learning model for classifying a holdup measurement can be applied to a spectral image to classify a holdup measurement from the spectral image.

For example, the machine learning classification model can be based on a convolutional neural network (CNN). Accordingly, a trained CNN model can be achieved with CNN image analysis and applied to classify a holdup measurement from a spectral image.

Figure 7B:
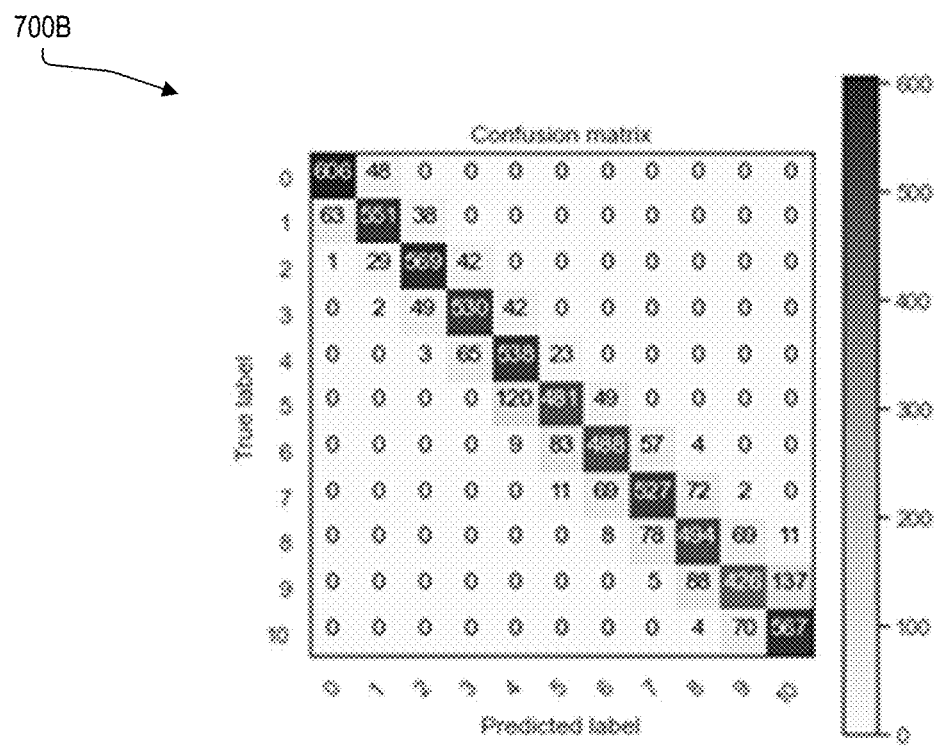
FIG. 7B illustrates an example of a confusion matrix of different quantized levels in which holdup measurements can be classified, in accordance with various aspects of the subject technology.

Referring to FIG. 7B, a confusion matrix 700B (i.e., error matrix) illustrates an example matrix of different quantized levels in which holdup measurements can be classified, in accordance with various aspects of the subject technology. The confusion matrix 700B can indicate the performance and quality of the classification model (i.e., CNN model). As illustrated in FIG. 7B, the confusion matrix 700B is a cross plot of a predicted label on a horizontal axis (i.e., x-axis) and a true label on a vertical axis (i.e., y-axis).

In the classification, absolute error is bound to be less than 5%. If model accuracy is 68%, then sigma is 5% ($\sigma=0.05$). If a model is trained to predict with 95% accuracy, the sigma error is 2.5% ($2\sigma=0.05$). When model accuracy reaches 99.7%, then the sigma error is 1.67% ($3\sigma=0.05$). As such, high accuracy can be achieved with CNN image analysis in classifying the holdup measurement from a spectral image.

Returning back to the flowchart shown in FIG. 6, at step 630, a continuous value for the component of the holdup measurement for the wellbore can be quantified based on a machine learning quantification model associated with the specific quantized level. For example, a gamma spectral analysis system can quantify a continuous value for the component of the holdup measurement for the wellbore based on a machine learning quantification model associated with the specific quantized level.

In some instances, a machine learning quantification model (e.g., regression) can be applied to determine a quantified value for the component of the holdup measurement within the specific quantified level. For example, the specific quantized level (i.e., classification label) as determined at the classification step (e.g, step 620 as described above) can provide a range of the holdup measurement. Within the specific quantized level or the range, the machine learning quantification model can be applied to predict a discrete value of the holdup measurement.

In some examples, a continuous value for the component of the holdup measurement can be quantified by applying a weighted function within the quantized level. The weighted functions can include an applicable machine learning technique for quantifying a component of a holdup measurement. For example, the weighted function can include a regression function associated with a specific quantized level that is applied to identify a component of a holdup measurement within the specific quantized level. A regression machine learning can be used to predict the continuous value for the component of the holdup measurement (e.g., volumetric ratio of oil, water, or gas) within the specific quantized level determined based on the spectral image at step 620.

Further, a continuous value for the component of the holdup measurement can be quantified by applying a probability distribution associated with the specific quantized level. For example, a probability distribution model can be trained to predict a discrete value for the holdup measurement.

FIG. 8A illustrates a confusion matrix 800A, which is a cross plot between a prediction label on the horizontal axis and a true label on the vertical axis. FIG. 8B illustrates a plot 800B of predictions of holdup measurements applied through a weighted function during a quantification step (e.g., step 630 as illustrated in FIG. 6), in accordance with various aspects of the subject technology. FIG. 8C illustrates a plot 800C of error as a function of frequency through a quantification step of applying a weighted function to predict holdup measurements within the specific quantized levels, in accordance with various aspects of the subject technology.

According to some examples, either or both the machine learning classification model (e.g., machine learning model applied at step 620) and/or the machine learning quantification model (e.g., machine learning model applied at step 630) can be trained across varying environmental features associated with gathering gamma spectrum data associated with the gamma spectrum downhole in the wellbore.

In some examples, the environmental features can include characteristics of a downhole tool configured to gather the gamma spectrum data. For example, the characteristics of the downhole tool can include a standoff of the downhole tool.

Furthermore, examples of the environmental features include, but are not limited to, a hole size of the wellbore, a casing size of a casing lining the wellbore, a tool standoff of a downhole tool, porosity of a surrounding formation, oil saturation of the surrounding formation, and lithology of the surrounding formation.

According to some examples, either or both the machine learning classification technique and/or the weighted function can be trained from one or a combination of (labeled) gamma spectrum data generated from one or more simulated gamma spectrum data, test gamma spectrum data, and historical gamma spectrum data across varying environmental features.

Example advantages of the gamma spectral analysis system and method described above can provide the following advantages compared to currently available holdup methodologies. For example, the present disclosure can enable advanced deep learning capability and utilize training of a machine learning model for different borehole and formation variations to compensate effects from those varying characteristics (e.g., a hole size, a casing size, or a tool standoff) and formations (e.g., porosity, saturation, or lithology).

Further, the present disclosure can provide improved accuracy of a holdup measurement where accuracy can be improved by cohesively taking in all available information including tool, well information, production history, and other downhole and surface data.

Furthermore, the present disclosure can provide an integrated holdup measurement such as discrete holdup values with minimum absolute error and a solution for a two-stage (e.g., oil and water) or a three-stage (e.g., oil, water, and gas) holdup measurement.

Other advantages of the present disclosure include improved generality and applicability in addition to reduced dependency on rigorous computer simulation. For example, a new coding platform of the present disclosure can provide real-time diagnostic capability with complete capture of remote memory across heterogenous operation systems, which is not available in a conventional system.

Figure 9:
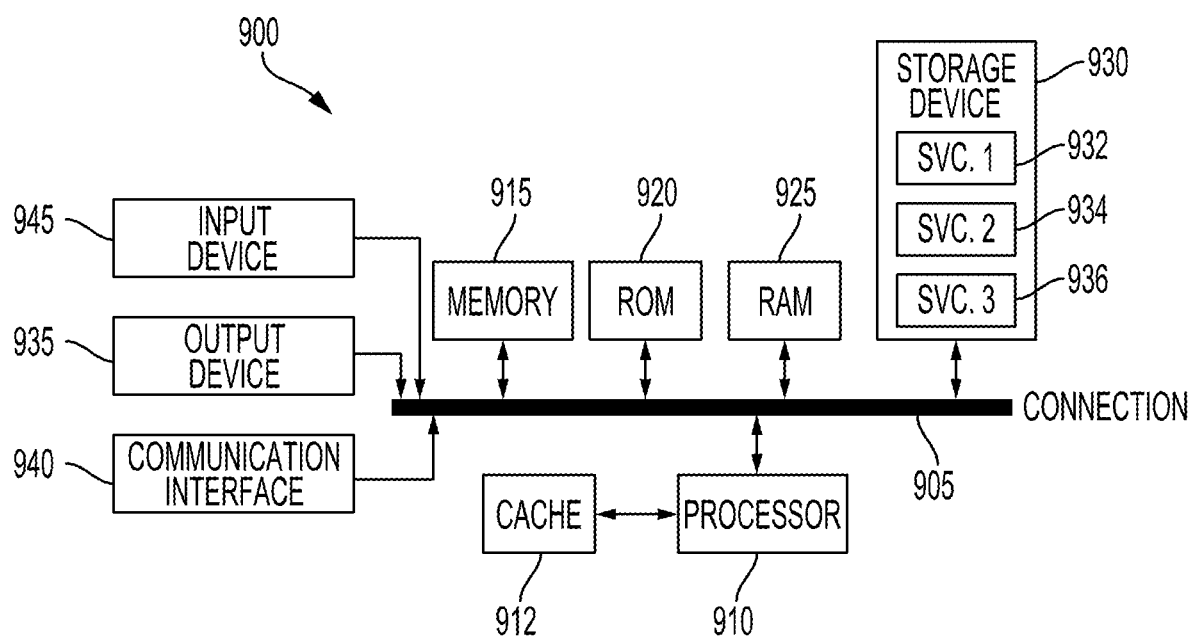
FIG. 9 is a schematic diagram of an example computing device architecture, in accordance with some examples.

FIG. 9 illustrates an example computing device architecture 900, which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 9 illustrates an example computing device architecture 900 of a computing device which can implement the various technologies and techniques described herein. For example, the computing device architecture 900 can implement a gain control system or control system. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

The disclosures shown and described above are only examples. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims.

Statements of the disclosure include:

Statement 1. A method comprising: accessing a spectral image associated with a gamma spectrum generated downhole in a wellbore; classifying a component of a holdup measurement for the wellbore into a specific quantized level of a plurality of quantized levels of holdup measurements through application of a machine learning classification model to the spectral image; and quantifying a continuous value for the component of the holdup measurement for the wellbore based on a machine learning quantification model associated with the specific quantized level.

Statement 2. The method of Aspect 1, wherein the component of the holdup measurement includes at least one of a volume of oil in the wellbore, a volume of gas in the wellbore, and a volume of water in the wellbore.

Statement 3. The method of any of Aspects 1 to 2, wherein the machine learning classification model is a convolutional neural network.

Statement 4. The method of any of Aspects 1 to 3, wherein the machine learning quantification model is a regression.

Statement 5. The method of any of Aspects 1 to 4, wherein either or both the machine learning classification model and the machine learning quantification model are trained across varying environmental features associated with gathering gamma spectrum data associated with the gamma spectrum downhole in the wellbore.

Statement 6. The method of any of Aspects 1 to 5, wherein the environmental features include one or a combination of a hole size of the wellbore, a casing size of a casing lining the wellbore, a tool standoff of a downhole tool, porosity of a surrounding formation, oil saturation of the surrounding formation, and lithology of the surrounding formation.

Statement 7. The method of any of Aspects 1 to 6, wherein either or both the machine learning classification model and the machine learning quantification model are trained from labeled gamma spectrum data generated from one or more simulated gamma spectrum data, test gamma spectrum data, and historical gamma spectrum data across varying environmental features.

Statement 8. The method of any of Aspects 1 to 7, wherein the machine learning quantification model includes application of a weighted function within the specific quantized level.

Statement 9. The method of any of Aspects 1 to 8, wherein the machine learning quantification model includes application of a probability distribution associated with the specific quantized level.

Statement 10. The method of any of Aspects 1 to 9, wherein the spectral image is a pixelated image, wherein a location of a pixel corresponds to an energy channel of the gamma spectrum and a brightness of the pixel corresponds to a count rate of the gamma spectrum.

Statement 11. A system comprising one or more processors and at least one computer-readable storage medium having stored therein instructions. The instructions, when executed by the one or more processors, cause the one or more processors to: access a spectral image associated with a gamma spectrum generated downhole in a wellbore; classify a component of a holdup measurement for the wellbore into a specific quantized level of a plurality of quantized levels of holdup measurements through application of a machine learning classification model to the spectral image; and quantify a continuous value for the component of the holdup measurement for the wellbore based on a machine learning quantification model associated with the specific quantized level.

Statement 12. The system of Aspect 11, wherein the component of the holdup measurement includes at least one of a volume of oil in the wellbore, a volume of gas in the wellbore, and a volume of water in the wellbore.

Statement 13. The system of any of Aspects 11 to 12, wherein the machine learning classification model is a convolutional neural network.

Statement 14. The system of any of Aspects 11 to 13, wherein the machine learning quantification model is a regression.

Statement 15. The system of any of Aspects 11 to 14, wherein either or both the machine learning classification model and the machine learning quantification model are trained across varying environmental features associated with gathering gamma spectrum data associated with the gamma spectrum downhole in the wellbore.

Statement 16. The system of any of Aspects 11 to 15, wherein the environmental features include one or a combination of a hole size of the wellbore, a casing size of a casing lining the wellbore, a tool standoff of a downhole tool, porosity of a surrounding formation, oil saturation of the surrounding formation, and lithology of the surrounding formation.

Statement 17. The system of any of Aspects 11 to 16, wherein either or both the machine learning classification model and the machine learning quantification model are trained from labeled gamma spectrum data generated from one or more simulated gamma spectrum data, test gamma spectrum data, and historical gamma spectrum data across varying environmental features.

Statement 18. The system of any of Aspects 11 to 17, wherein the machine learning quantification model includes application of a weighted function within the specific quantized level.

Statement 19. The system of any of Aspects 11 to 18, wherein the machine learning quantification model includes application of a probability distribution associated with the specific quantized level.

Statement 20. The system of any of Aspects 11 to 19, wherein the spectral image is a pixelated image, wherein a location of a pixel corresponds to an energy channel of the gamma spectrum and a brightness of the pixel corresponds to a count rate of the gamma spectrum.

Statement 21. A non-transitory computer-readable storage medium having stored therein instructions which, when executed by one or more processors, cause the one or more processors to: access a spectral image associated with a gamma spectrum generated downhole in a wellbore; classify a component of a holdup measurement for the wellbore into a specific quantized level of a plurality of quantized levels of holdup measurements through application of a machine learning classification model to the spectral image; and quantify a continuous value for the component of the holdup measurement for the wellbore based on a machine learning quantification model associated with the specific quantized level.

Statement 22. The computer readable medium of Aspect 21, wherein the component of the holdup measurement includes at least one of a volume of oil in the wellbore, a volume of gas in the wellbore, and a volume of water in the wellbore.

Statement 23. The computer readable medium of any of Aspects 21 to 22, wherein the machine learning classification model is a convolutional neural network.

Statement 24. The computer readable medium of any of Aspects 21 to 23, wherein the machine learning quantification model is a regression.

Statement 25. The computer readable medium of any of Aspects 21 to 24, wherein either or both the machine learning classification model and the machine learning quantification model are trained across varying environmental features associated with gathering gamma spectrum data associated with the gamma spectrum downhole in the wellbore.

Statement 26. The computer readable medium of any of Aspects 21 to 25, wherein the environmental features include one or a combination of a hole size of the wellbore, a casing size of a casing lining the wellbore, a tool standoff of a downhole tool, porosity of a surrounding formation, oil saturation of the surrounding formation, and lithology of the surrounding formation.

Statement 27. The computer readable medium of any of Aspects 21 to 26, wherein either or both the machine learning classification model and the machine learning quantification model are trained from labeled gamma spectrum data generated from one or more simulated gamma spectrum data, test gamma spectrum data, and historical gamma spectrum data across varying environmental features.

Statement 28. The computer readable medium of any of Aspects 21 to 27, wherein the machine learning quantification model includes application of a weighted function within the specific quantized level.

Statement 29. The computer readable medium of any of Aspects 21 to 28, wherein the machine learning quantification model includes application of a probability distribution associated with the specific quantized level.

Statement 30. The computer readable medium of any of Aspects 21 to 29, wherein the spectral image is a pixelated image, wherein a location of a pixel corresponds to an energy channel of the gamma spectrum and a brightness of the pixel corresponds to a count rate of the gamma spectrum.

What is claimed is:

1. A method comprising:
   accessing a spectral image associated with a gamma spectrum generated downhole in a wellbore;
   classifying a component of a holdup measurement for the wellbore into a specific quantized level of a plurality of quantized levels of holdup measurements through application of a machine learning classification model to the spectral image; and
   quantifying a continuous value for the component of the holdup measurement for the wellbore based on a machine learning quantification model associated with the specific quantized level.

2. The method of claim 1, wherein the component of the holdup measurement includes at least one of a volume of oil in the wellbore, a volume of gas in the wellbore, and a volume of water in the wellbore.

3. The method of claim 1, wherein the machine learning classification model is a convolutional neural network.

4. The method of claim 1, wherein the machine learning quantification model is a regression.

5. The method of claim 1, wherein either or both the machine learning classification model and the machine learning quantification model are trained across varying environmental features associated with gathering gamma spectrum data associated with the gamma spectrum downhole in the wellbore.

6. The method of claim 5, wherein the environmental features include one or a combination of a hole size of the wellbore, a casing size of a casing lining the wellbore, a tool standoff of a downhole tool, porosity of a surrounding formation, oil saturation of the surrounding formation, and lithology of the surrounding formation.

7. The method of claim 1, wherein either or both the machine learning classification model and the machine learning quantification model are trained from labeled gamma spectrum data generated from one or more simulated gamma spectrum data, test gamma spectrum data, and historical gamma spectrum data across varying environmental features.

8. The method of claim 1, wherein the machine learning quantification model includes application of a weighted function within the specific quantized level.

9. The method of claim 1, wherein the machine learning quantification model includes application of a probability distribution associated with the specific quantized level.

10. The method of claim 1, wherein the spectral image is a pixelated image, wherein a location of a pixel corresponds to an energy channel of the gamma spectrum and a brightness of the pixel corresponds to a count rate of the gamma spectrum.

11. A system comprising:
one or more processors; and
at least one computer-readable storage medium having stored therein instructions which, when executed by the one or more processors, cause the one or more processors to:
  access a spectral image associated with a gamma spectrum generated downhole in a wellbore;
  classify a component of a holdup measurement for the wellbore into a specific quantized level of a plurality of quantized levels of holdup measurements through application of a machine learning classification model to the spectral image; and
  quantify a continuous value for the component of the holdup measurement for the wellbore based on a machine learning quantification model associated with the specific quantized level.

12. The system of claim 11, wherein the component of the holdup measurement includes at least one of a volume of oil in the wellbore, a volume of gas in the wellbore, and a volume of water in the wellbore.

13. The system of claim 11, wherein the machine learning classification model is a convolutional neural network.

14. The system of claim 11, wherein the machine learning quantification model is a regression.

15. The system of claim 11, wherein either or both the machine learning classification model and the machine learning quantification model are trained across varying environmental features associated with gathering gamma spectrum data associated with the gamma spectrum downhole in the wellbore.

16. A non-transitory computer-readable storage medium having stored therein instructions which, when executed by one or more processors, cause the one or more processors to:
  access a spectral image associated with a gamma spectrum generated downhole in a wellbore;
  classify a component of a holdup measurement for the wellbore into a specific quantized level of a plurality of quantized levels of holdup measurements through application of a machine learning classification model to the spectral image; and
  quantify a continuous value for the component of the holdup measurement for the wellbore based on a machine learning quantification model associated with the specific quantized level.

17. The non-transitory computer-readable storage medium of claim 16, wherein the component of the holdup measurement includes at least one of a volume of oil in the wellbore, a volume of gas in the wellbore, and a volume of water in the wellbore.

18. The non-transitory computer-readable storage medium of claim 16, wherein the machine learning classification model is a convolutional neural network.

19. The non-transitory computer-readable storage medium of claim 16, wherein the machine learning quantification model is a regression.

20. The non-transitory computer-readable storage medium of claim 16, wherein either or both the machine learning classification model and the machine learning quantification model are trained across varying environmental features associated with gathering gamma spectrum data associated with the gamma spectrum downhole in the wellbore.

* * * * *